United States Patent
Liuhanen et al.

[11] 3,779,325
[45] Dec. 18, 1973

[54] MOTOR GUARD
[75] Inventors: Heikki Liuhanen; Kauko Kallio, both of Oulu, Finland
[73] Assignee: Valmet Oy, Helsinki, Finland
[22] Filed: Apr. 7, 1972
[21] Appl. No.: 242,184

[52] U.S. Cl............. 180/1 R, 36/2.5 AB, 180/5 R, 180/68 P, 224/45 S, 280/11.37 R
[51] Int. Cl............................................. A63c 13/00
[58] Field of Search................. 180/68 P, 5 R, 1 R; 238/14; 36/2.5 AB; 280/11.37 R; 264/5 Z, 45 S

[56] References Cited
UNITED STATES PATENTS
3,619,915  11/1971  Cheney........................... 36/2.5 AB
3,640,459  2/1972   Preisler................................ 238/14
2,410,702  11/1946  Arsenault........................ 36/2.5 AB

OTHER PUBLICATIONS

"Trackster" Owners Manual, Cushman Motors.

*Primary Examiner*—Leo Friaglia
*Assistant Examiner*—David M. Mitchell
*Attorney*—Richards & Geier

[57] ABSTRACT

A detachable motor guard for cross-country and snow vehicles which normally serves to cover the engine compartment ventilation opening and which, in an emergency, can be detached and used as a snow shoe.

2 Claims, 2 Drawing Figures

MOTOR GUARD

Prior art includes net-like motor guards, made of various materials, for such vehicles, the purpose of which is to protect the engine against dust, snow, foreign objects, to reduce the noise of the engine and to improve the appearance of the vehicle.

It is possible with a snow vehicle, even with a light motor sleigh intended for recreational purposes, to drive in soft snow in less than one hour a distance which the driver is unable to travel without any aids in the event of failure of his vehicle. The rescue means most appropriate in such instances, skis or snowshoes, are not usually included in the standard accessories of existing snow vehicles. On the other hand if they have been provided as accessories they are easily left behind under normal circumstances because they are considered unnecessary.

The aim of the present invention is to avoid the above drawback in a simple manner. The invention is mainly characterized in that the motor guard is of such design that it is suitable to be used as a bog and/or snow shoe.

The excellent quality of the motor guard according to the invention is in fact due to the idea that the motor guard serves in its principal capacity while the vehicle is in full working order and exceptionally serves as a bog and/or snow shoe, in circumstances in which the motor guard is not otherwise needed.

When one travels in bog regions, the ground which allows walking is usually in sight, but in this case, too, several hours can be saved and wet clothes avoided when the vehicle fails, if the motor guard may be used as a bog shoe.

Figure 1:
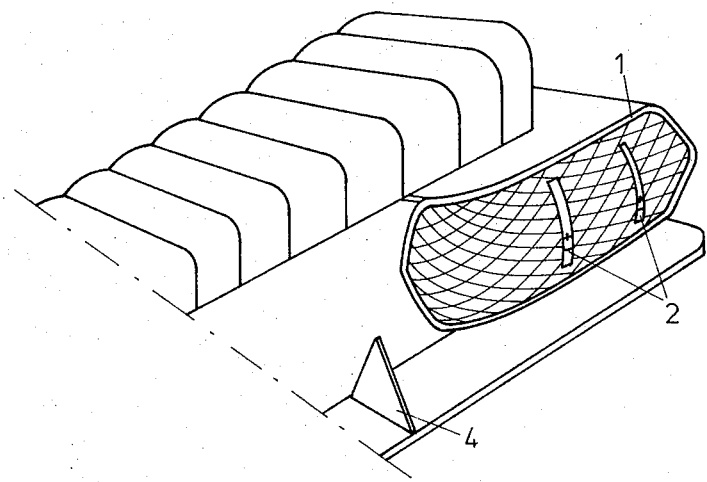

The invention is described in detail with reference to the figures in the attached drawing, wherein FIG. 1 shows part of a snow vehicle with its motor guard.

Figure 2:
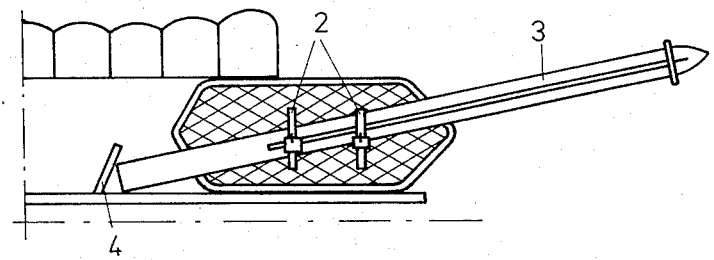

FIG. 2 shows the same, seen straight from one side, and in addition with skis attached to the motor guard.

The detachable motor guard according to the invention, 1, consists of a net or sheet made of metal, plastic, glass fibre or equivalent material and mounted on a body frame and which has such size, shape and weight that, affixed to a person's foot, it enables the person to walk more easily on soft ground than if he were only wearing a usual shoe. The motor guard 1 is held in its place on the vehicle by quick-action fasteners previously known in themselves. The motor guard 1 may consist of one unit which is divisible into two parts, or of two separate units. For attachment to the user's foot the motor guard 1 has fixing means 2, e.g., a leather strap or straps, which may be used as in FIG. 2 to fasten skis 3. In that case the ends of the skis on one side are most appropriately braced against the foot rest 4 of the vehicle.

The motor guard 1 according to the invention serves in normal conditions as its name indicates. In an exceptional situation, when the vehicle fails on ground that does not support a person on foot, the motor guard 1 or motor guards are detached and affixed to the foot, after which the person in distress is able to reach safety on his own.

We claim:

1. For use with a cross-country and snow vehicle, a motor guard adapted to be removably connected to said vehicle said guard comprising an elongated rigid frame surrounding a perforated body capable of holding dirt while passing air, said guard to be positioned over the ventilation opening to the motor and having fastening means upon an outer surface thereof, said fastening means adapted to be attached to a person's shoe for use as an emergency snow shoe when the guard is removed from the vehicle.

2. A motor guard according to claim 4, wherein said fastening means are adapted to hold skis while the motor guard is connected to the vehicle.

* * * * *